(12) United States Patent
Winters

(10) Patent No.: US 8,933,152 B2
(45) Date of Patent: Jan. 13, 2015

(54) SPUN-DYED ARAMID FIBERS

(75) Inventor: Robin Winters, Bemmel (NL)

(73) Assignee: Teijin Aramid B.V., Arnhem (NL)

( * ) Notice: Subject to any disclaimer, the term of this patent is extended or adjusted under 35 U.S.C. 154(b) by 137 days.

(21) Appl. No.: 13/880,857

(22) PCT Filed: Oct. 6, 2011

(86) PCT No.: PCT/EP2011/067427
§ 371 (c)(1),
(2), (4) Date: Apr. 22, 2013

(87) PCT Pub. No.: WO2012/055685
PCT Pub. Date: May 3, 2012

(65) Prior Publication Data
US 2013/0210971 A1   Aug. 15, 2013

(30) Foreign Application Priority Data
Oct. 28, 2010  (EP) ...................................... 10189219

(51) Int. Cl.
| | |
|---|---|
| *C08K 5/3492* | (2006.01) |
| *C08K 5/18* | (2006.01) |
| *D06P 7/00* | (2006.01) |
| *D01F 1/04* | (2006.01) |
| *D01F 6/60* | (2006.01) |
| D21H 13/26 | (2006.01) |
| *C08J 5/06* | (2006.01) |
| *D02G 1/00* | (2006.01) |
| *C08K 5/00* | (2006.01) |

(Continued)

(52) U.S. Cl.
CPC . *D06P 7/005* (2013.01); *D01F 1/04* (2013.01); *D01F 6/605* (2013.01); *D21H 13/26* (2013.01); *C08J 5/06* (2013.01); *D02G 1/00* (2013.01); C08K 5/0041 (2013.01); C08K 5/3492 (2013.01); C08J 2300/00 (2013.01)
USPC ................... 524/100; 524/256; 8/566; 8/602; 8/638

(58) Field of Classification Search
USPC ................. 524/100, 256; 8/566, 602, 638
See application file for complete search history.

(56) References Cited

U.S. PATENT DOCUMENTS

2006/0010620 A1 *   1/2006   Krabbe et al. ................... 8/638

FOREIGN PATENT DOCUMENTS

| | | |
|---|---|---|
| EP | 0 295 672 | 12/1988 |
| EP | 0 356 579 | 3/1990 |
| WO | WO 02/00974 A1 | 1/2002 |
| WO | WO 02/051921 A1 | 7/2002 |
| WO | WO 2004/020731 A1 | 3/2004 |

OTHER PUBLICATIONS

Feb. 29, 2012 International Search Report issued in PCT/EP2011/067427.
Feb. 29, 2012 Written Opinion issued in PCT/EP2011/067427.

* cited by examiner

*Primary Examiner* — Kriellion Sanders
(74) *Attorney, Agent, or Firm* — Oliff PLC

(57) ABSTRACT

Spun-dyed aramid fibers, wherein spun-dyeing was performed with a completely organic pigment exhibiting the chemical structure of formula (I):

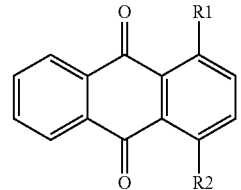

(I)

Figure 1:
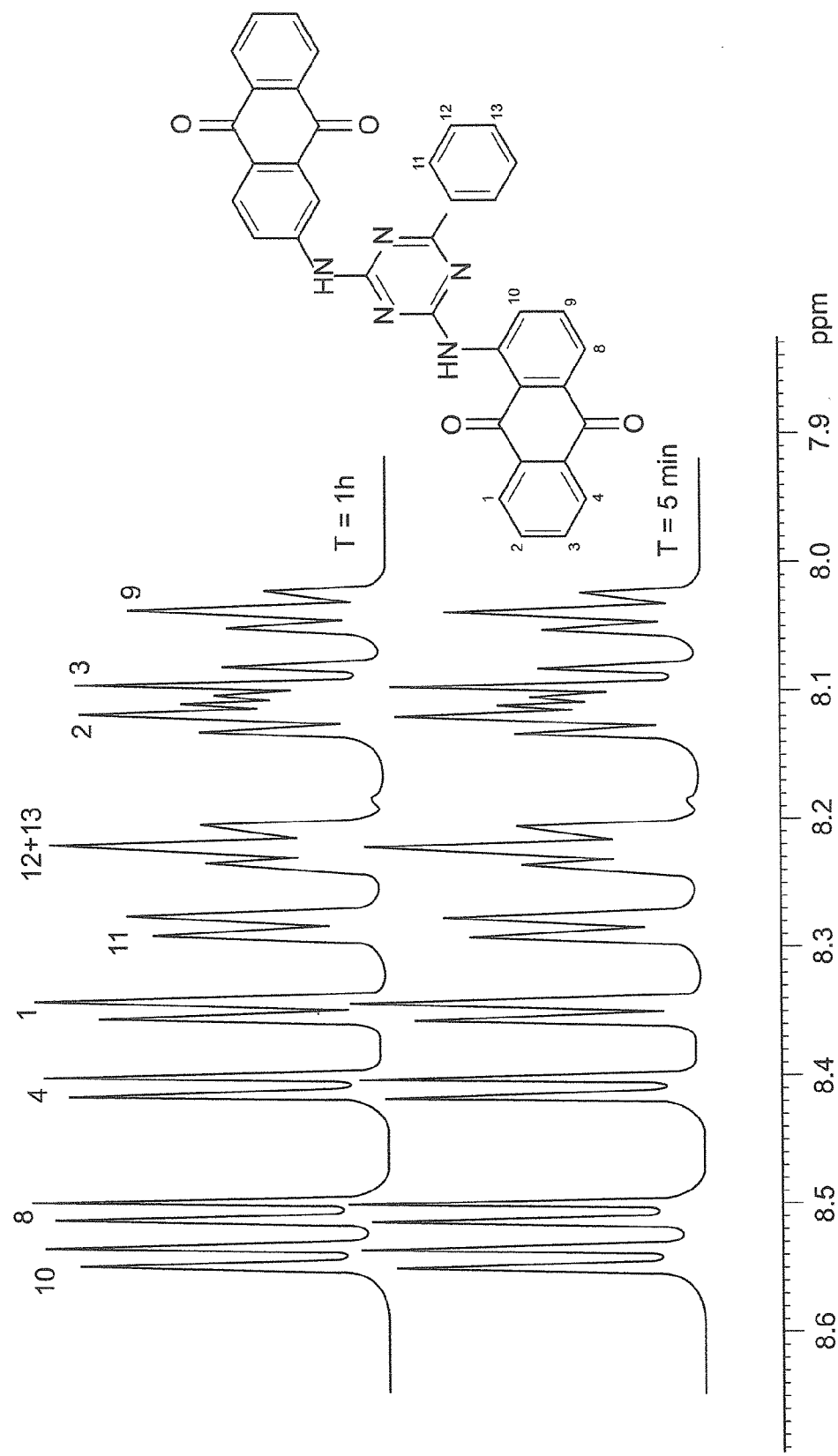

wherein, independently from one another, $R_1$ represents a substituent of formula $X_a$ or a substituent of formula $X_b$:

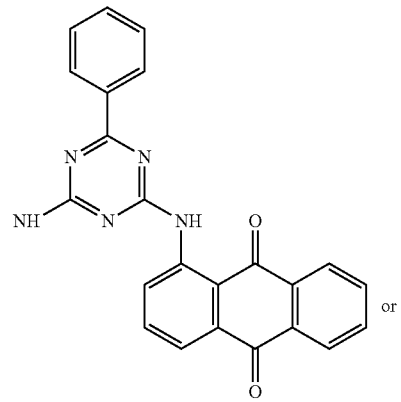

$X_a$ or $X_b$

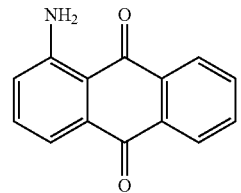

wherein $X_a$ is linked via the group NH having two bonds in the structure represented by $X_a$, while $X_b$ is linked via the carbon atom, which is in a para relationship with the $NH_2$-group of $X_b$; and $R_2$ represents H or $NH_2$. The spun-dyed aramid fibers exhibit constant coloristic properties and wash proof properties.

10 Claims, 2 Drawing Sheets

SPUN-DYED ARAMID FIBERS

BACKGROUND

The invention pertains to spun-dyed aramid fibers.

Spun-dyed aramid fibers are known. EP 0 356 579 A describes spun-dyed p-aramid fibers containing 0.01 to 6% by weight of a completely organic pigment selected from the groups of (1) monoazo and diazo pigments, (2) anthanthrone pigments, (3) indanthrone pigments, (4) pyranthrone pigments, (5) vilanthrone pigments, (6) flavanthrone pigments, (7) quinacridone pigments, (8) dioxazine pigments, (9) indigoid and thioindigoid pigments and (10) isoindolinone pigments. Though said spun-dyed fibers exhibit a good maintenance of their colouristic properties, customers always desire further spun-dyed aramid fibers, which—as possible—exhibit a better fastness of colouristic properties of spun-dyed aramid fibers, especially under humid conditions of use and during washing.

Therefore, the problem of the present invention is to provide further spun-dyed aramid fibers with at least the same or better fastness of colouristic properties.

SUMMARY

Said problem is solved by spun-dyed aramid fibers, wherein spun-dyeing was performed with a completely organic pigment, characterized in that the pigment exhibits the chemical structure of formula (I),

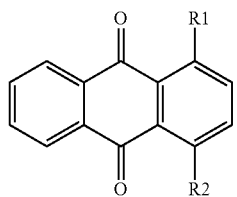
(I)

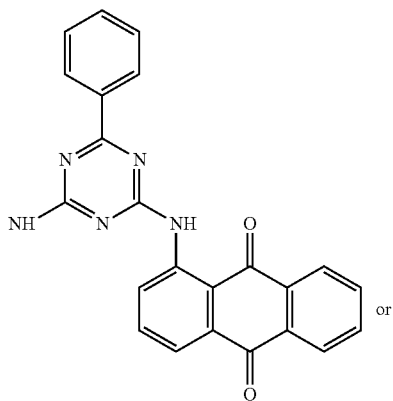

wherein independently from one another
$R_1$ represents a substituent of formula $X_a$ or a substituent of formula $X_b$ $X_a$

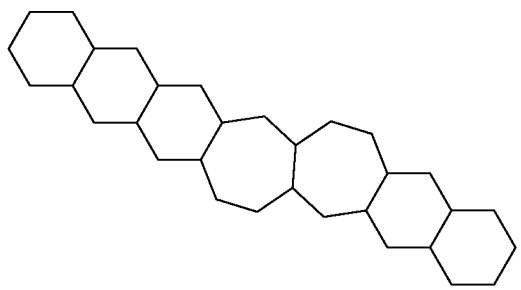

or

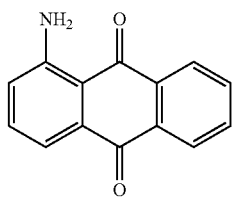
$X_b$ wherein $X_a$ is linked via the group NH on the left hand side of the triazine ring,
whilst $X_b$ is linked via the carbon atom, which is in a para relationship with the $NH_2$-group, and $R_2$ represents H or $NH_2$.

Surprisingly, the inventive spun-dyed aramid fibers exhibit a fastness of colouristic properties, especially under humid conditions of use and during washing, which at least equals that of the spun-dyed aramid fibers of the prior art. In preferred embodiments the spun-dyed aramid fibers of the present invention exhibit an even better fastness of colouristic properties than the spun-dyed aramid fibers of the prior art.

DETAILED DESCRIPTION OF EMBODIMENTS

Within the scope of the present invention the term "completely organic pigment" means a pigment, the chemical structure of which does not contain any metal or any metal ion.

In a preferred embodiment of the spun-dyed aramid fibers of the present invention $R_1$ represents the substituent $X_a$

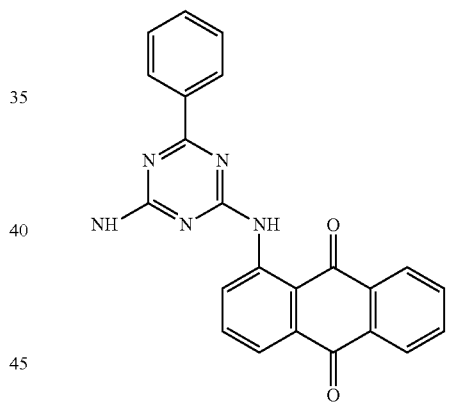

and $R_2$ represents H, so that the pigment is 1,1'-[(6-Phenyl-1,3,5-triazine-2,4-diyl)diimino]bisanthraquinone (C.I. Pigment Yellow 147), which can be obtained from CIBA-Geigy (BE) under the designation Filester Yellow RNB.

In a further preferred embodiment of the spun-dyed aramid fibers of the present invention $R_1$ represents the substituent $X_b$

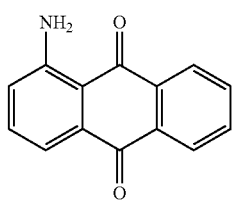 [SMILES: Nc1cccc2c1C(=O)c1ccccc1C2=O]

and R$_2$ represents NH$_2$, so that the pigment is 1,1'-Diamino-4-4'-dianthraquinonyl (C.I. Pigment Red 177), which can be obtained from Clariant International Ltd. (CH) under the designation Hostaperm Red M2B.

In a further preferred embodiment of the spun-dyed aramid fibers of the present invention the pigment is a mixture of a first weight part consisting of C.I. Pigment Yellow 147 and a second weight part consisting of C.I. Pigment Red 177, wherein said first and second weight parts add to 100 wt. % of the pigment contained in the spun-dyed aramid fibers of the present invention. Depending on the chosen values for the first and second weight part spun-dyed aramid fibers with different orange colours can be provided.

The weight percentage of the pigment of formula (I) based on the weight of the spun-dyed aramid fibers of the present invention can be chosen depending of the desired colouristic effect and preferably ranges from 0.1 weight % to 6 weight %, even more preferred from 0.5 weight % to 4 weight %.

Within the scope of the present invention the term "spun-dyed aramid fibers" means filaments or filament yarns, consisting of an aromatic polyamide as the fiber forming polymer, i.e. of a copolymer, wherein at least 85% of the amide (—CO—NH—) bonds are directly bonded with two aromatic rings.

P-aramid fibers, especially poly(p-phenylene terephthalamide) fibers are preferred as the aramid fibers in the present invention and can be obtained under the trade name TWARON by Teijin Aramid GmbH (DE). The fiber-forming polymer of poly(p-phenylene terephthalamide) fibers is a polymer obtained by the mol:mol polymerization of p-phenylene diamine and terephthalic acid dichloride. Furthermore, as the fiber-forming polymer for the purposes of the present invention aromatic copolymers are suited as well, wherein p-phenylene diamine and/or terephthalic acid are substituted partly or completely by other aromatic diamines and/or dicarboxylic acids.

The favourable properties of the spun-dyed aramid fiber of the present invention qualify said fiber to be used in all kind of applications, in which aramid-fibers can be used.

For example the spun-dyed aramid fibers of the present invention can be used to manufacture crimped and cut fibers. The crimped and cut fibers can be used mainly for manufacturing textile fabrics, which can be a woven, nonwoven, knitted, crocheted or braided textile fabrics. Furthermore, the spun dyed fibers of the present invention can be used for manufacturing textile fabrics directly, without crimping and cutting them.

The spun dyed aramid fibers of the present invention can also be converted into pulp.

Furthermore, the spun-dyed aramid fibers of the present invention can be used together with a matrix resin or without a matrix resin to manufacture a composite.

Still another attractive use of the spun-dyed aramid fibers of the present invention is to manufacture a rip-cord for optical cables. A rip-cord is a constituent of the core protection of optical fibers in an optical cable. The rip cord is generally used to split open the outer shell of the cable.

Aramid fibers spun-dyed especially with triazine C.I. Pigment Yellow 147, i.e. with 1,1'-[(6-Phenyl-1,3,5-triazine-2,4-diyl)diimino]bisanthraquinone can be manufactured by a process comprising the steps a) preparing a mixture of (C.I. Pigment Yellow 147)-powder with a sandy spin dope consisting of poly(p-phenylene terephthalamide) and concentrated sulphuric acid which contains at least 80 weight % H$_2$SO$_4$, wherein said mixture preferably exhibits a concentration of C.I. Pigment Yellow 147 in the range from 0.07 weight % to 1.2 weight % and a concentration of poly(p-phenylene terephthalamide) in the range from 14 weight % to 20 weight %, b) transporting the mixture into a single or double screw extruder, or into a single or double shaft kneader, c) heating the mixture in the melt extruder to a temperature in the range of 70° C. to 95° C., most preferably to 85° C., d) spinning the heated mixture through an orifice into an air gap and then into a coagulation bath consisting of water or aqueous sulphuric acid to coagulate the mixture into coagulated fibers, e) washing the coagulated fibers with water and/or diluted alkali, f) drying the washed fibers and g) winding the dried fiber.

In step a) of the above process the mixture of the pigment with the sandy spin dope can be prepared either by dispersing the pigment powder in the concentrated sulphuric acid and dosing the (pigment/concentrated sulphuric acid)-dispersion to the molten aramid spin dope or adding the pigment powder to the solid or molten aramid spin dope.

As mentioned before, surprisingly the spun-dyed aramid fibers of the present invention exhibit a fastness of colouristic properties, especially under humid conditions of use and during washing, which at least equals that of the spun-dyed aramid fibers of the prior art. Without the wish to be bound to a particular theory one reason for said high degree of maintenance of the colouristic properties might be the surprisingly high stability of pigments of formula (I) against sulfonation under conditions of solvent and temperature similar to the conditions in the aramid spin dope. The inventors measured $^1$H NMR-spectra of C.I. Pigment Yellow 147 and of C.I. Pigment Red 177. For this purpose 20 mg of the corresponding pigment was dissolved in 98 weight % D$_2$SO$_4$ just before measuring. The solution was inserted into a ceramic spinner and the spinner was inserted into an NMR apparatus (Bruker Advance III 400 MHz NMR spectrometer) set at 80° C. $^1$H NMR-spectra were measured in time intervals of 5 minutes.

FIG. 1 shows the obtained $^1$H NMR-spectra of C.I. Pigment Yellow 147 after 5 minutes and after 1 hour. FIG. 1 also shows the formula of C.I. Pigment Yellow 147 together with figures ranging from 1 to 4 and 8 to 13 which mark the positions of carbon-hydrogen bonds in the pigment, wherein the hydrogen atom (H; not shown in FIG. 1) could be substituted by a sulfonic acid group (SO$_3$H). The $^1$H NMR peaks originated by said H atoms are also identified in the obtained spectra. FIG. 1 shows, that the peaks of all of the H atoms after 1 hour in the 80° C. D$_2$SO$_4$ are completely identical with the peaks after 5 minutes. So, surprisingly not any sulfonation occurred in C.I. Pigment Yellow 147.

Figure 2:
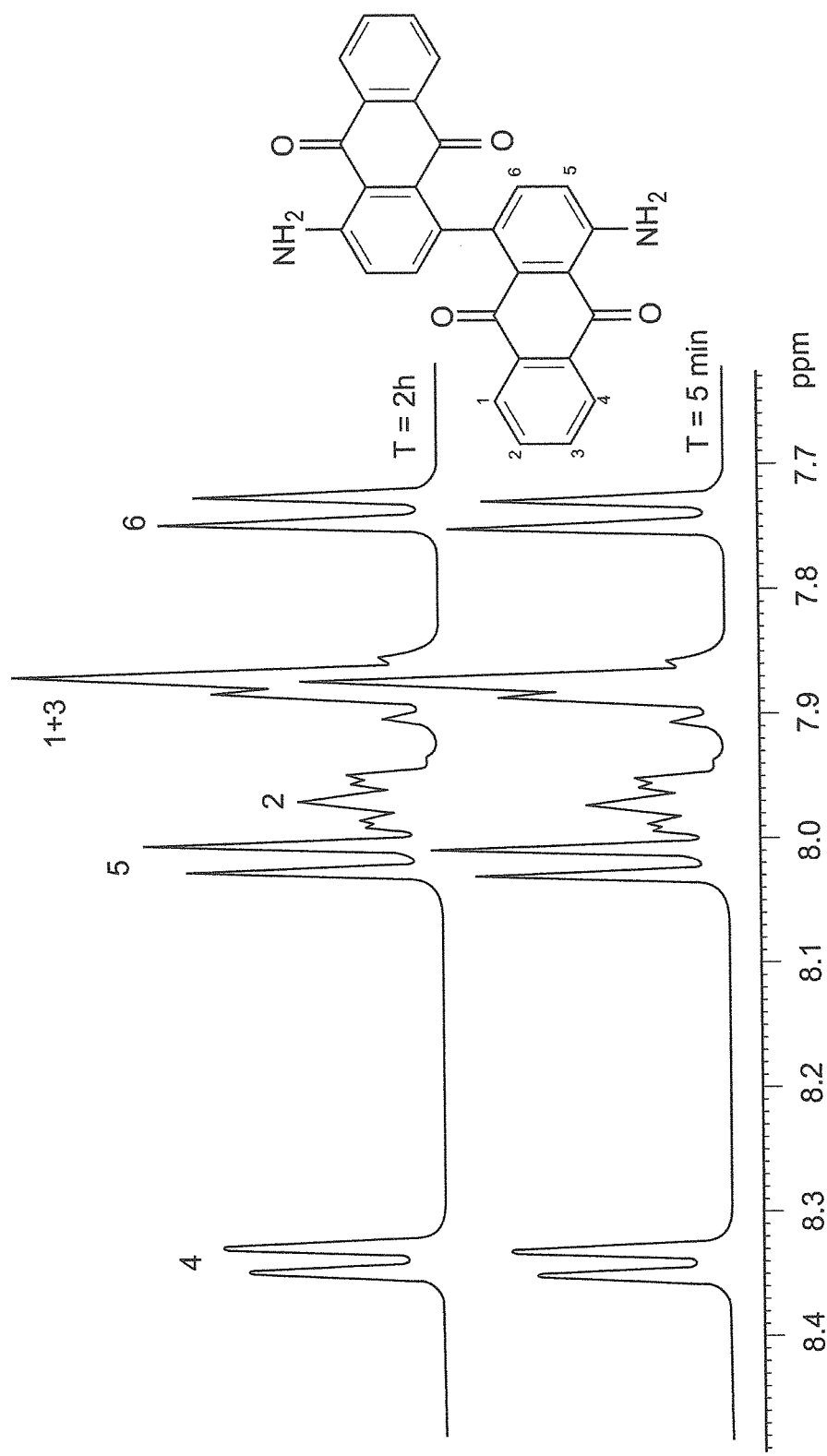

FIG. 2 shows the obtained $^1$H NMR-spectra of C.I. Pigment Red 177 after 5 minutes and after 2 hours. FIG. 2 also shows the formula of C.I. Pigment Red 177 together with figures ranging from 1 to 6 which mark the positions of carbon-hydrogen bonds in the pigment, wherein the hydrogen atom (H; not shown in FIG. 2) could be substituted by a sulfonic acid group (SO$_3$H). The $^1$H NMR peaks originated by said H atoms are also identified in the obtained spectra. FIG. 2 shows, that the peaks of all of the H atoms after 2 hours in the 80° C. D$_2$SO$_4$ are completely identical with the peaks after 5 minutes. So, surprisingly not any sulfonation occurred in C.I. Pigment Red 177.

The surprisingly high resistance of pigments of formula (I) against highly concentrated sulfuric acid is also beneficial for the spinning process to obtain the spun-dyed aramid fibers according to the present invention, because said pigments are not chemically modified in the presence of the highly concentrated sulfuric acid which is used for preparing and spinning the aramid spin-dope containing said pigments.

Furthermore, it was found that pigments of formula (I) exhibit a surprisingly high stability under alkaline conditions, even under high concentrations of alkali. Therefore, the spun-dyed aramid fibers according to the present invention pass the alkaline neutralization step (e) of the process described above without being chemically modified. And the spun-dyed aramid fibers according to the present invention pass alkaline laundering conditions without being chemically modified.

EXAMPLES

The invention is explained in more detail in the following examples.

Example 1 i) Preparation of a Sandy Spin Dope and of a Pigment Pre-Mix

A sandy spin dope was prepared consisting of 19.85 wt. % poly(p-phenylene terephthalamide) (PPTA) in concentrated sulphuric acid, i.e. in 99.8 wt. % $H_2SO_4$. The PPTA had a relative viscosity $\eta_{rel}$=4.8-5.2. $\eta_{rel}$ was measured in a solution of 0.025 g/ml PPTA in 96 wt. % $H_2SO_4$ at 25° C.

The following three pigments
C.I. Pigment Yellow 147, i.e. with
  1,1'-[(6-Phenyl-1,3,5-triazine-2,4-diyl)diimino]bisanthraquinone,
C.I. Pigment Red 122, i.e. with
  5,12-Dihydro-2,9-dimethylquino[2,3-b]acridine-7,14-dione, and
C.I. Pigment Blue 15, i.e. with
  (29H,31H-phthalocyaninato(2-)-N29,N30,N31,N32)copper.
were mixed in a (1:1:1)-weight ratio in 99.8 wt. % $H_2SO_4$ resulting in a pigment pre-mix, wherein the total amount of pigment in $H_2SO_4$ was 20 wt. %.

C.I. Pigment Red 122 and C.I. Pigment Blue 15 were added in order to obtain spun-dyed PPTA-fibers having incorporated an internal colouristic red standard and an internal colouristic blue standard needed to evaluate the colouristic properties of the spun-dyed PPTA fibers in a ($L^*a^*b^*$)-measuring device described in v). C.I. Pigment Red 122 and C.I. Pigment Blue 15 can be used as internal colouristic standards for red and blue, respectively, because it was found, that both the colour of C.I. Pigment Red 122 and the colour of C.I. Pigment Blue 15 do not change in colouristic properties during spinning and washing.

ii) Preparation of a Coloured Sandy Spin Dope

The pigment pre-mix and the sandy spin dope were both fed separately and continuously to a single shaft kneader, heated in the single shaft kneader at a temperature in the range of 80-85° C. resulting in a coloured sandy spin dope, which additionally to the PPTA and the concentrated sulphuric acid consisted of 0.4 wt. % C.I. Pigment Yellow 147, 0.4 wt. % C.I. Pigment Red 122, and 0.4 wt. % C.I. Pigment Blue 15. As indicated by the systematic names of C.I. Pigment Red 122 and of C.I. Pigment Blue 15 both of said pigments do not fall under formula (I).

iii) Spinning of the Dope

The coloured sandy spin dope obtained from ii) was spun through an orifice into an air gap and then into a coagulation bath consisting of aqueous sulphuric acid (10 wt. %) to obtain coagulated fibers. The coagulated fibers were washed with water and diluted alkali. The washed fibers were dried and wound resulting in a spun-dyed PPTA multifilament yarn (yarn titer: 3360 dtex, 2000 individual filaments) containing
2 wt. % C.I. Pigment Yellow 147,
2 wt. % C.I. Pigment Red 122, and
2 wt. % C.I. Pigment Blue 15.

iv) Washing of the Spun-Dyed Multifilament Yarn 8 grams of the spun-dyed multifilament yarn obtained in iii) were washed five times in a washing machine (Miele WS5436 using washing program A). In each of the five washings 20 grams of a regular washing powder (brand 'All classic professional', ex. Unilever) were used and a washing temperature of 95° C. was applied.

v) Colouristic Characterization of the Spun-Dyed Fibers

In order to determine the washing fastness, the spun-dyed fibers were characterized before and after the five times washing described in iv) by an ($L^*a^*b^*$)—measurement using a Minolta CM3600-D Spectrophotometer.

In order to diminish the influence of the glare and fibrillation effects of the spun-dyed fibers on the results of the ($L^*a^*b^*$)-measurement not the spun-dyed fibers were used for the ($L^*a^*b^*$)-measurement, but tablets, which were obtained from the spun-dyed fibers by grinding and pressing as described in the following.

A $1^{st}$ sample of the spun-dyed multifilament yarn obtained from iii) was grinded in a Herzog HMS 100 grinding mill and cold pressed to a $1^{st}$ tablet with a Fontijn TP400 press. In the same manner a $2^{nd}$ sample of the spun-dyed multifilament yarn obtained from iii) was transformed into a $2^{nd}$ tablet. The resulting values for $L^*$, $a^*$ and $b^*$ of the $1^{st}$ and $2^{nd}$ tablet were arithmetically averaged. The resulting averages of $L^*$, $a^*$ and $b^*$ represent the colouristic properties of the spun-dyed fibers before washing.

Analogously the same procedure was performed with washed spun-dyed fibers obtained from iv). The resulting averages $L^*$, $a^*$ and $b^*$ represent the colouristic properties of the spun-dyed fibers after washing.

The differences of the corresponding averages before and after washing were used to quantify the colouristic stability of the spun-dyed fibers in terms of $\Delta b^*$ and $\Delta E_{ab^*}$ as described in the following.

As mentioned before, the colouristic properties both of C.I. Pigment Red 122 and C.I. Pigment Blue 15 doe not change during spinning and washing. Therefore, colouristic differences of the spun-dyed fibers after the five time washing are purely caused by the applied yellow pigment, i.e. in this example by C.I. Pigment Yellow 147.

With respect to C.I. Pigment Yellow 147 especially the shift of the $b^*$-value, $\Delta b^* = (b^*_2 - b^*_1)$, is of interest. This is, because $\Delta b^*$ quantifies the (yellow to blue)-shift in the ($L^*a^*b^*$)-diagram caused by the five washings. Therefore, $\Delta b^*$ quantifies the degree of colouristic stability of C.I. Pigment Yellow 147 in the spun-dyed fibers: The lower Δb* the higher is the colouristic stability of the yellow pigment, i.e. in this example of C.I. Pigment Yellow 147, in the PPTA-fibers.

A further parameter to quantify the colouristic stability of C.I. Pigment Yellow 147 in the PPTA-fibers, is the total colour change $\Delta E_{ab*}$, which was determined from the formula $$\Delta E_{ab*}=[(L*_2-L*_1)^2+(a*_2-a_1)^2+(b*_2-b*_1)^2]^{1/2},$$

wherein L*, a* and b* are the measured values in the (L*a*b*)-coordinate system, and wherein L* is the lightness component in the (L*a*b*)-diagram,
a* is the red component in the (L*a*b*)-diagram,
b* is the yellow component in the (L*a*b*)-diagram,
index 1 denotes before washing, and
index 2 denotes after five times washing.

The lower $\Delta E_{ab*}$ the higher is the colouristic stability of the applied yellow pigment, i.e. in this example of C.I. Pigment Yellow 147, in the PPTA-fibers.

In the table below $\Delta E_{ab*}$, and Δb* are shown.

Comparative Example 1

Comparative example 1 was performed as example 1 with the only difference that instead of the C.I. Pigment Yellow 147 C.I. Pigment Yellow 110 was used.

C.I. Pigment Yellow 110 is Bis(4,5,6,7-Tetrachloro-3-oxoisoindolin-1-ylidene)-1,4-phenylenediamine and therefore, does not fall under formula (I).

The resulting spun-dyed PPTA multifilament yarn contained 2 wt. % C.I. Pigment Yellow 110, 2 wt. % C.I. Pigment Red 122, and 2 wt. % C.I. Pigment Blue 15.

In the table below $\Delta E_{ab}*$, and Δb* are shown.

Comparative Example 2

Comparative example 2 was performed as example 1 with the only difference that instead of the C.I. Pigment Yellow 147 C.I. Pigment Yellow 139 was used.

C.I. Pigment Yellow 139 is 5,5'-(1H-Isoindole-1,3(2H)-diylidene)dibarbituric acid and therefore, does not fall under formula (I).

The resulting spun-dyed PPTA multifilament yarn contained 2 wt. % C.I. Pigment Yellow 139, 2 wt. % C.I. Pigment Red 122, and 2 wt. % C.I. Pigment Blue 15.

In the table below $\Delta E_{ab*}$, and Δb* are shown.

TABLE

|  | Δb* | $\Delta E_{ab*}$ |
| --- | --- | --- |
| Example 1 | 0.10 | 0.7 |
| Comparative example 1 | 0.30 | 1.2 |
| Comparative example 2 | 2.45 | 2.7 |

The comparison of example 1 with comparative examples 1 and 2 in the table exhibits, that both Δb* and $\Delta E_{ab*}$ of the spun-dyed PPTA-fibers containing C.I. Pigment Yellow 147 are significantly lower than Δb* and $\Delta E_{ab*}$ of the spun-dyed PPTA-fibers containing C.I. Pigment Yellow 110 and C.I. Pigment Yellow 139.

So, the fastness of colouristic properties of the spun-dyed PPTA-fibers containing C.I. Pigment Yellow 147 is significantly better than the fastness of colouristic properties of the spun-dyed PPTA-fibers containing C.I. Pigment Yellow 110 and C.I. Pigment Yellow 139.

The invention claimed is:

1. Spun-dyed aramid fibers, wherein spun-dyeing was performed with a completely organic pigment having the chemical structure of formula (I),

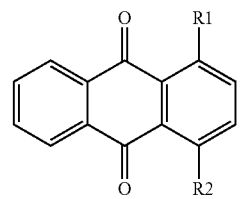

(I)

wherein independently from one another $R_1$ represents a substituent of formula $X_a$ or a substituent of formula $X_b$

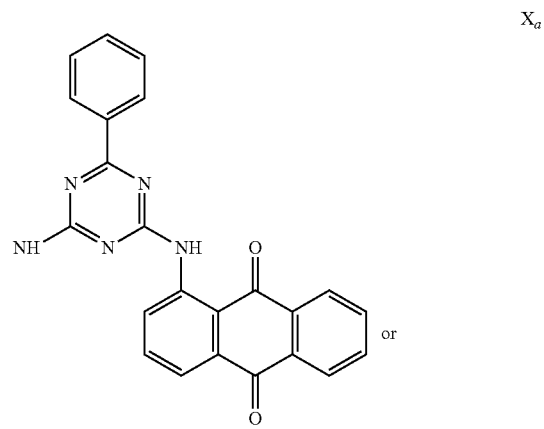

$X_a$ or

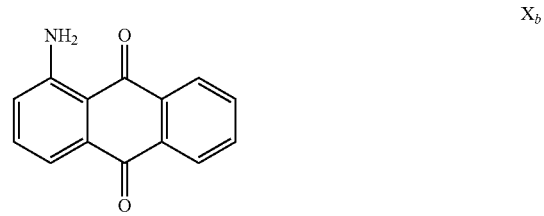

$X_b$ wherein $X_a$ is linked via the group NH having only one N—C bond in the structure represented by $X_a$, whilst $X_b$ is linked via the carbon atom, which is in a para relationship with the $NH_2$-group of $X_b$, and $R_2$ represents H or $NH_2$.

2. The spun-dyed aramid fibers according to claim 1, wherein

R₁ represents the substituent $X_a$

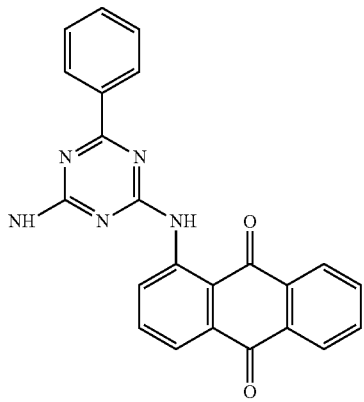 [SMILES: Nc1nc(Nc2cccc3c2C(=O)c2ccccc2C3=O)nc(-c2ccccc2)n1]

and R₂ represents H.

3. The spun-dyed aramid fibers according to claim 1, wherein

R₁ represents the substituent $X_b$

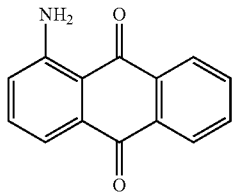

and R₂ represents NH₂.

4. The spun-dyed aramid fibers according to claim 1, wherein a weight percentage of the pigment of formula (I) based on the weight of the spun-dyed aramid fibers ranges from 0.1 weight % to 6 weight %.

5. The spun-dyed aramid fibers according to claim 1, wherein the aramid fibers are p-aramid fibers.

6. A method comprising:

manufacturing crimped and cut fibers, wherein manufacturing crimped and cut fibers includes using the spun-dyed aramid fibers according to claim 1.

7. A method comprising:

manufacturing pulp, wherein manufacturing pulp includes using the spun-dyed aramid fibers according to claim 1.

8. A method comprising:

manufacturing a composite, wherein manufacturing a composite includes using the spun-dyed aramid fibers according claim 1 together with a matrix resin.

9. A method comprising:

manufacturing a textile fabric, wherein manufacturing a textile fabric includes using the spun-dyed aramid fibers according to claim 1.

10. A method comprising:

manufacturing a rip-cord for optical cables, wherein manufacturing a rip-cord for optical cables includes using the spun-dyed aramid fibers according to claim 1.

* * * * *

UNITED STATES PATENT AND TRADEMARK OFFICE
CERTIFICATE OF CORRECTION

PATENT NO. : 8,933,152 B2
APPLICATION NO. : 13/880857
DATED : January 13, 2015
INVENTOR(S) : Robin Winters Page 1 of 1

It is certified that error appears in the above-identified patent and that said Letters Patent is hereby corrected as shown below:

In the Claims

Column 10, Line 20, Claim 8, please change "according claim 1" to --according to claim 1--.

Signed and Sealed this
Fifth Day of May, 2015

Michelle K. Lee
*Director of the United States Patent and Trademark Office*